United States Patent
Renaud et al.

(10) Patent No.: US 12,319,420 B2
(45) Date of Patent: Jun. 3, 2025

(54) AIRCRAFT PROPULSION ASSEMBLY COMPRISING AT LEAST ONE AERODYNAMIC PANEL WHICH IS SUPPORTED BY AT LEAST ONE INTERMEDIATE RADIAL SUPPORT, AIRCRAFT COMPRISING AT LEAST ONE SUCH PROPULSION ASSEMBLY

(71) Applicant: Airbus Operations SAS, Toulouse (FR)

(72) Inventors: Eric Renaud, Toulouse (FR); Thomas Deforet, Toulouse (FR); Mathieu Kaleta, Toulouse (FR); Antoine Claveyrollas, Toulouse (FR); Mathieu Mahe, Toulouse (FR); Ginesa Torres Lopez, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/673,984

(22) Filed: May 24, 2024

(65) Prior Publication Data

US 2024/0400216 A1 Dec. 5, 2024

(30) Foreign Application Priority Data

May 29, 2023 (FR) ...................................... 2305313

(51) Int. Cl.
*B64D 29/06* (2006.01)
*F01D 25/24* (2006.01)

(52) U.S. Cl.
CPC ............. *B64D 29/06* (2013.01); *F01D 25/24* (2013.01)

(58) Field of Classification Search
CPC ........ F01D 25/24; F01D 25/243; F01D 25/28; B64D 29/06; B64D 29/00; B64C 7/02; B64C 9/36; F02K 1/70
See application file for complete search history.

(56) References Cited

U.S. PATENT DOCUMENTS 7,090,165 B2 * 8/2006 Jones .................. F02C 7/00
  244/54
7,334,393 B2 * 2/2008 Porte .................. B64C 7/02
  60/226.1

(Continued)

FOREIGN PATENT DOCUMENTS

FR 2978731 A1 * 2/2013 ............. B64D 33/02
FR 3031360 A1 7/2016

(Continued)

OTHER PUBLICATIONS

FR3055922 translation (Year: 2018).*

(Continued)

*Primary Examiner* — Brian P Wolcott
(74) *Attorney, Agent, or Firm* — Greer, Burns & Crain, Ltd.

(57) ABSTRACT

A propulsion assembly comprising a fan casing and a nacelle which comprises an air inlet which is connected to the front end of the fan casing, an intermediate portion which is positioned around the fan casing and a rear portion which cooperates with the rear end of the fan casing. The intermediate portion comprises at least one aerodynamic panel which extends from a front edge which is attached to the air inlet as far as a rear edge which is attached to the rear portion and at least one intermediate radial support comprising an internal edge which is connected to the fan casing and an external edge which is connected to the aerodynamic panel, this panel comprising a front edge which is connected to the air inlet by a first connection system. Also an aircraft with such a propulsion assembly.

14 Claims, 4 Drawing Sheets

(56) References Cited

U.S. PATENT DOCUMENTS

| | | | |
|---|---|---|---|
| 8,092,169 B2* | 1/2012 | Cloft | B64D 33/02 415/220 |
| 8,197,191 B2* | 6/2012 | Binks | B64D 29/08 415/214.1 |
| 9,663,238 B2* | 5/2017 | Kane | B64D 33/02 |
| 10,589,869 B2* | 3/2020 | Wittman | F02C 7/05 |
| 11,753,968 B2* | 9/2023 | Nikolaus | F02K 1/827 415/119 |
| 11,840,352 B2* | 12/2023 | Ferrier | B64D 33/02 |
| 12,103,694 B2* | 10/2024 | Ferrier | F02C 7/047 |
| 12,116,931 B2* | 10/2024 | Guillois | F02C 7/045 |
| 2002/0148929 A1* | 10/2002 | Andre | B64D 15/04 244/134 R |
| 2013/0111873 A1* | 5/2013 | Balk | F01D 21/045 415/220 |
| 2014/0147270 A1* | 5/2014 | Porte | F02C 7/04 415/214.1 |
| 2016/0039528 A1 | 2/2016 | Caruel | |
| 2016/0251085 A1* | 9/2016 | Stark | B64D 29/00 244/53 R |
| 2022/0042454 A1* | 2/2022 | Caruel | F02C 7/045 |
| 2022/0082064 A1* | 3/2022 | Boileau | B64D 33/04 |

FOREIGN PATENT DOCUMENTS

| | | | | |
|---|---|---|---|---|
| FR | 3055922 A1 * | 3/2018 | | F01D 25/243 |
| FR | 3126964 A1 | 3/2023 | | |
| WO | 2014170609 A1 | 10/2014 | | |
| WO | 2020239870 A1 | 12/2020 | | |

OTHER PUBLICATIONS

FR 2978731 Translation (Year: 2013).*

French Search Report from corresponding French application No. 2305313, dated Nov. 7, 2023.

* cited by examiner

AIRCRAFT PROPULSION ASSEMBLY COMPRISING AT LEAST ONE AERODYNAMIC PANEL WHICH IS SUPPORTED BY AT LEAST ONE INTERMEDIATE RADIAL SUPPORT, AIRCRAFT COMPRISING AT LEAST ONE SUCH PROPULSION ASSEMBLY

CROSS-REFERENCES TO RELATED APPLICATIONS

This application claims the benefit of French Application Number 2305313 filed on May 29, 2023, the entire disclosure of which is incorporated herein by way of reference.

FIELD OF THE INVENTION

The present application relates to an aircraft propulsion assembly comprising at least one aerodynamic panel which is supported by at least one intermediate radial support and an aircraft comprising at least one such propulsion assembly.

BACKGROUND OF THE INVENTION

According to an embodiment which can be seen in FIG. 1, an aircraft 10 comprises a fuselage 12, a wing unit 14, at least one propulsion assembly 16 and at least one strut 18 which connects the propulsion assembly 16 and the wing unit 14.

As illustrated in FIG. 3, the propulsion assembly 16 comprises a motorization unit 20 which has a motorization axis A20 and a nacelle 22 which is positioned around the motorization unit 20.

For the present application, a longitudinal direction is a direction parallel with the motorization axis A20. A radial direction is a direction perpendicular to the motorization axis A20. A longitudinal plane is a plane which contains the motorization axis A20. A transverse plane is a plane perpendicular to the motorization axis A20. The terms "front"/"upstream" and "rear"/"downstream" are intended to be understood to refer to the direction of flow of the air which is introduced into the nacelle 22 and which flows in a downstream direction.

As illustrated in FIG. 2, the strut 18 comprises a primary structure 18.1 which connects the motorization unit 20 and the wing unit 14, a fairing 18.2 and a secondary structure 18.3 which supports particularly the fairing 18.2 and equipment items.

The motorization unit 20 comprises a fan and a fan casing 24 which surrounds the fan and which extends between a front end 24.1 and a rear end 24.2.

The nacelle 22 comprises an air inlet 26, an intermediate portion 28 which is located around the fan casing 25 and a rear portion 30 which extends between the intermediate portion 28 and a trailing edge 30.1. This rear portion 30 comprises a thrust reversal device.

As illustrated in FIGS. 3 and 4, the air inlet 26 comprises a lip 32 which is located at the front, an internal conduit 34 which extends the lip 32 towards the interior of the nacelle 22 as far as an internal rear edge 34.1 which is connected to the front end 24.1 of the fan casing 24, an external wall 36 which extends the lip 32 towards the exterior of the nacelle 22 as far as an external rear edge 36.1 and a first annular frame 38 which connects the internal and external rear edges 34.1 and 36.1.

The rear portion 30 comprises a support 40 and a movable portion 42 which is configured to move longitudinally in a backward direction in order to generate at least one lateral opening for the thrust reversal device. The support 40 comprises a second annular frame 44 which has an internal edge 44.1 which cooperates with the rear end 24.2 of the fan casing 24.

The rear portion 30 is approximately tubular or frustoconical and is composed of two C-shaped half-sections which are substantially symmetrical relative to a vertical longitudinal plane. Each half-section comprises an upper edge which is connected to the secondary structure 18.3 of the strut 18 by an articulation which has a pivot axis which is substantially parallel with the longitudinal direction. Thus, each C-shaped half-section can pivot between a closed position, in which the lower edges of the C-shaped half-sections are abutting and retained in a closed position by a locking system, and an open position, in which the lower edges of the C-shaped half-sections are spaced apart and allow access to the motorization unit 20.

The intermediate portion 28 comprises two C-shaped caps 46 which are substantially symmetrical relative to a vertical longitudinal plane. Each cap 46 comprises an upper edge which is connected to the secondary structure 18.3 of the strut 18 via an articulation 48 (visible in FIG. 2) which has a pivot axis A48 which is substantially parallel with the longitudinal direction. Thus, each cap 46 can pivot between a closed position, in which the lower edges of the caps 46 are abutting and retained in a closed position by a locking system, and an open position, in which the lower edges of the caps 46 are spaced apart and allow access to the motorization unit 20, and to a technical zone 50 which is located between the caps 46, the fan casing 24 and the first and second annular frames 38, 44. Some equipment items 52 of the thrust reversal device, such as actuators, for example, are positioned in this technical zone 50 and distributed over the circumference of the nacelle 22.

According to a configuration which can be seen in FIG. 4, each cap 46 extends between a front edge 46.1 which rests in a closed position against an edge which is fixedly joined to the first annular frame 38 of the air inlet 26 and a rear edge 46.2 which rests in a closed position against an edge which is fixedly joined to the second annular frame 44 of the rear portion 38.

This embodiment is not completely satisfactory for the following reasons.

The fact that the caps 46 are connected to the secondary structure 18.3 of the strut 18 makes it necessary to extend the secondary structure 18.3 and the fairing 18.2 of the strut 18 in a forward direction, which brings about an increase of the mass of the aircraft.

According to another disadvantage, it is necessary to pivot the caps 46 into an open position in order to be able to open the C-shaped half-sections of the rear portion 30.

The caps 46 being articulated in the region of the upper edges thereof, their front and rear edges 46.1, 46.2 are not connected to the remainder of the nacelle by connection elements and simply rest against edges. Consequently, there are risks of scooping, particularly via the front edge 46.1 of the caps 46, which may bring about accidental opening of the caps 46 during flight and damage thereto.

The present invention is intended to overcome all or some of the disadvantages of the prior art.

SUMMARY OF THE INVENTION

To this end, the invention relates to a propulsion assembly comprising a fan casing which extends between front and rear ends and a nacelle which comprises, in a backward direction, an air inlet which is connected to the front end of the fan casing, an intermediate portion which is positioned around the fan casing and a rear portion which cooperates with the rear end of the fan casing, the intermediate portion extending between a front edge which is attached to the air inlet and a rear edge which is attached to the rear portion and which comprises at least one aerodynamic panel which extends from the front edge as far as the rear edge of the intermediate portion.

According to the invention, the intermediate portion comprises at least one intermediate radial support comprising an internal edge which is connected to the fan casing and an external edge which is connected to the aerodynamic panel, this panel comprising a front edge which is connected to the air inlet by a first connection system.

According to a first advantage which is afforded by the invention, no aerodynamic panel of the intermediate portion is supported by the secondary structure of the strut, unlike the caps of the prior art. Consequently, the secondary structure of the strut can be shortened, which leads to a reduction of its mass. According to another advantage, the aerodynamic panels being fixed, no articulation is provided to make them pivot, which allows the mass of the propulsion assembly to be reduced.

According to another feature, the air inlet comprises a lip which is located at the front, an internal conduit which extends the lip towards the interior of the nacelle, a first external wall which extends the lip towards the exterior of the nacelle and a first annular frame which has an internal edge which is connected to the internal conduit and an external edge which is connected to the first external wall. In addition, the first connection system comprises at least a first edge which is fixedly joined to the first annular frame and which is positioned in the region of or near the external edge of the first annular frame and a plurality of connection elements which connect the aerodynamic panel and the first edge and which are distributed over at least a portion of the circumference of the nacelle.

According to another feature, each aerodynamic panel comprises a rear edge which is connected by a second connection system to the intermediate radial support. In addition, the second connection system comprises at least a second edge which is fixedly joined to the intermediate radial support and which is positioned in the region of or near the external edge of the intermediate radial support and a plurality of connection elements which connect the aerodynamic panel and the second edge and which are distributed over at least a portion of the circumference of the nacelle.

According to another feature, the rear portion comprises at least a second external wall and at least a second annular frame which has an internal edge which cooperates with the rear end of the fan casing and an external edge which is connected to the second external wall. In addition, the intermediate radial support is spaced apart from the second annular frame of the rear portion, the second external wall of the rear portion comprising at least one extension which extends in front of the second annular frame and which has a front edge which is slightly spaced apart from the aerodynamic panel(s).

According to another feature, the extension has a half-cylindrical shape. In addition, the rear portion comprises a plurality of brackets which connect the second annular frame and the extension and which are distributed over the circumference of the nacelle.

According to another feature, the intermediate radial support comprises a web which is positioned approximately (i.e., +/−10%) in a transverse plane and at least one rear wing which is offset towards the rear relative to the web, forming a support surface for the extension of the rear portion.

According to another feature, the propulsion assembly comprises at least one sealing joint which is interposed between the rear wing and the extension of the rear portion.

According to another feature, the intermediate portion comprises a plurality of aerodynamic panels which are attached to each other and which are distributed over the circumference of the nacelle.

According to another feature, the intermediate portion comprises at least one longitudinal reinforcement which has a first end which is connected to the air inlet and a second end which is connected to the intermediate radial support.

According to another feature, the intermediate portion comprises as many longitudinal reinforcements as aerodynamic panels, each longitudinal reinforcement being positioned in the region of a junction zone of two aerodynamic panels and being configured to form a support surface at a first longitudinal edge of a first aerodynamic panel and at a second longitudinal edge of a second panel.

According to another feature, each aerodynamic panel has an internal face which is orientated towards the fan casing, a front edge which is positioned in a first transverse plane, a rear edge which is positioned in a second transverse plane, a first longitudinal edge which is positioned in a first longitudinal plane and a second longitudinal edge which is positioned in a second longitudinal plane. In addition, each aerodynamic panel comprises in the region of the internal face thereof a central portion which is reinforced and spaced apart from the edges and which forms an excess thickness relative to the edges.

According to another feature, the intermediate portion comprises, for each aerodynamic panel, at least one centering system which is configured to position each aerodynamic panel during the mounting thereof.

According to another feature, the centering system comprises, for each aerodynamic panel, at least one centering pin which is fixedly joined to the aerodynamic panel and, for each centering pin, at least one centering hole which is configured to cooperate with the centering pin and which is provided in the region of an element which is fixedly joined to the fan casing.

According to another feature, the intermediate radial support extends over the entire circumference of the nacelle and comprises a plurality of recesses.

The invention also relates to an aircraft comprising at least one propulsion assembly according to one of the preceding features.

BRIEF DESCRIPTION OF THE DRAWINGS

Other features and advantages will be appreciated from the following description of the invention, which description is given merely by way of example, with reference to the appended drawings, in which.

DETAILED DESCRIPTION OF THE PREFERRED EMBODIMENTS

Figure 1:
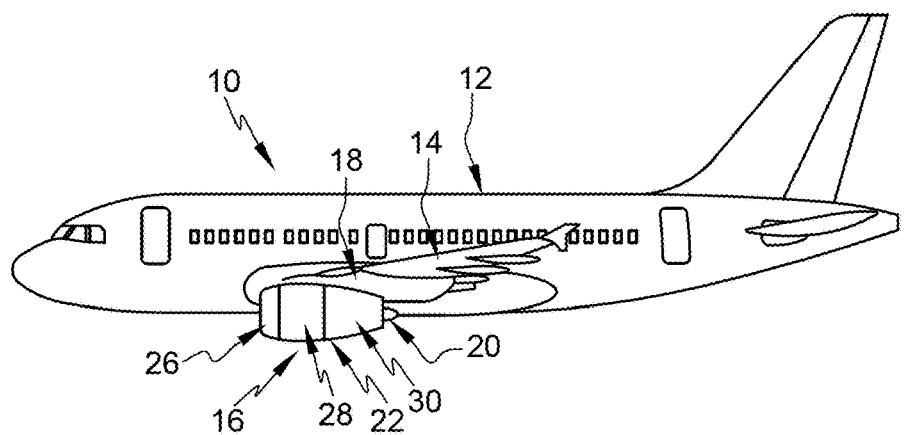
FIG. 1 is a side view of an aircraft.
Figure 2:
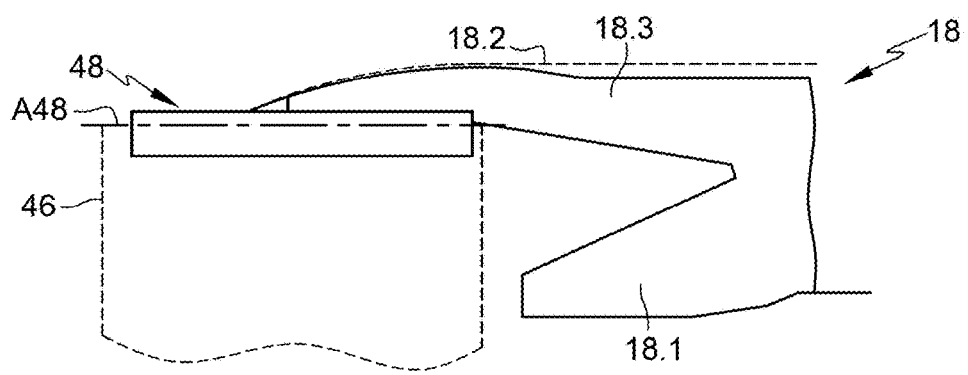
FIG. 2 is a schematic longitudinal section of a strut of an aircraft illustrating an embodiment of the prior art.
Figure 3:
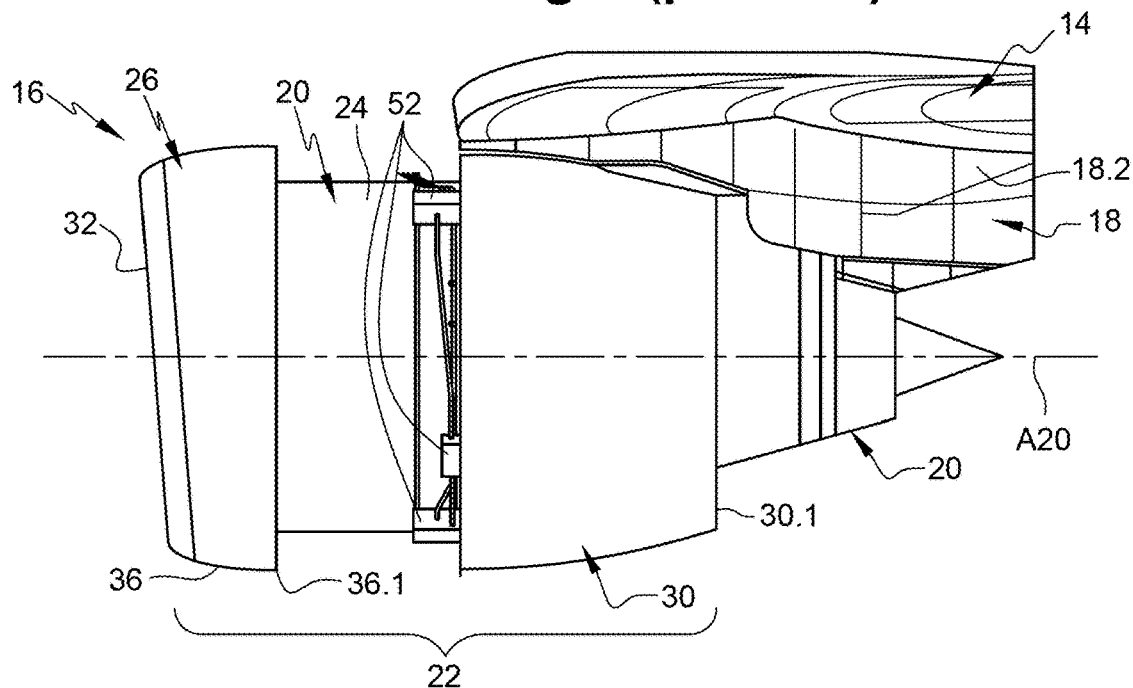
FIG. 3 is a side view of a propulsion assembly of an aircraft, without caps, illustrating an embodiment of the prior art.
Figure 4:
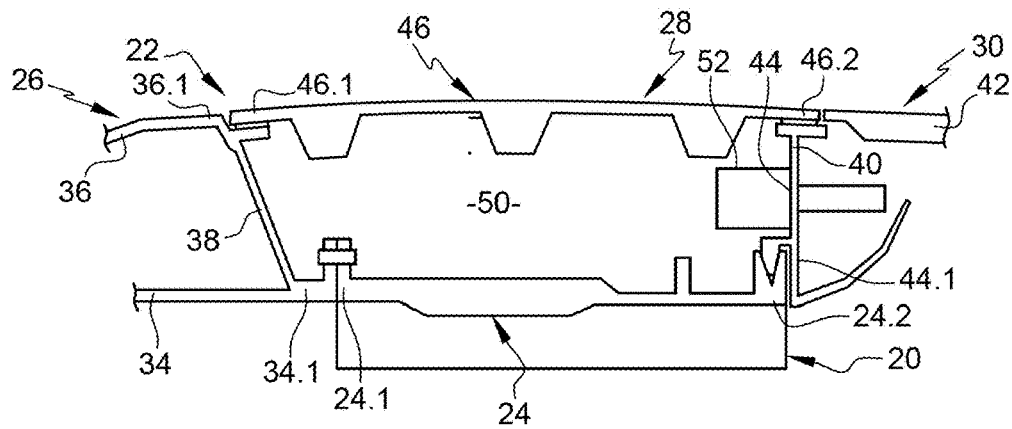
FIG. 4 is a schematic longitudinal section of a portion of a propulsion assembly illustrating an embodiment of the prior art.
Figure 5:
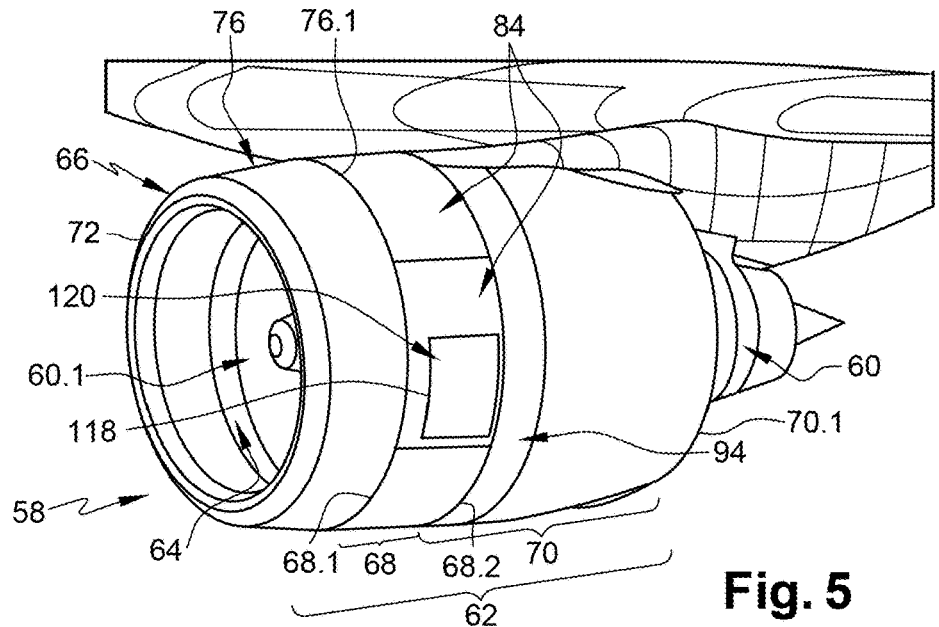
FIG. 5 is a perspective view of a propulsion assembly illustrating an embodiment of the invention.
Figure 8:
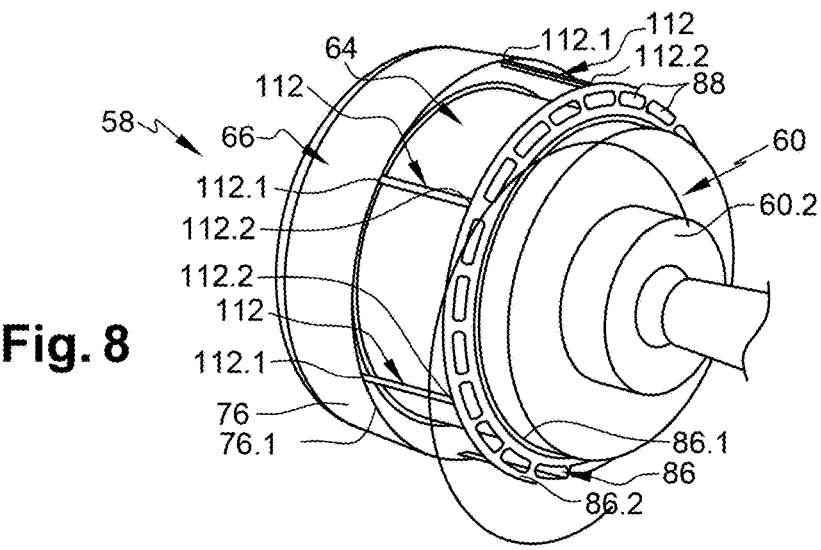
FIG. 8 is a schematic, perspective view of a portion of a propulsion assembly illustrating an embodiment of the invention.

According to an embodiment visible in FIGS. 5 and 8, a propulsion assembly 58 comprises a motorization unit 60 and a nacelle 62 which is positioned around the motorization unit 60.

According to one application, an aircraft comprises a fuselage, a wing unit, at least one propulsion assembly 58 which is positioned under the wing unit and at least one strut which connects the propulsion assembly 58 and the wing unit. The strut comprises a primary structure which connects the motorization unit 60 and the wing unit, a fairing and a secondary structure which supports particularly the fairing and equipment items.

The motorization unit 60 comprises a fan 60.1, a reactor core 60.2 and a tubular fan casing 64 which surrounds the fan 60.1 and which extends between a front end 64.1 and a rear end 64.2.

The nacelle 62 comprises an air inlet 66, an intermediate portion 68 which is located around the fan casing 64 and a rear portion 70 which extends between the intermediate portion 68 and a trailing edge 70.1. According to one configuration, the nacelle 62 comprises a thrust reversal device which is substantially positioned in the rear portion 70. The intermediate portion 68 extends between a front edge 68.1 which is attached to the air inlet 66 and a rear edge 68.2 which is attached to the rear portion 70.

As illustrated in FIGS. 5, 6, 7 and 9, the air inlet 66 comprises a lip 72 which is located at the front, an internal conduit 74 which extends the lip 72 towards the interior of the nacelle 62 as far as an internal rear edge 74.1 which is connected to the front end 64.1 of the fan casing 64, a first external wall 76 which extends the lip 72 towards the exterior of the nacelle 62 as far as an external rear edge 76.1 and a first annular frame 78 which connects the internal and external rear edges 74.1 and 76.1. Thus, this first annular frame 78 comprises an internal edge 78.1 which is connected to the internal rear edge 74.1 of the internal conduit and an external edge 78.2 which is connected to the external rear edge 76.1 of the first external wall 76.

According to one embodiment, the rear portion 70 comprises at least one second external wall 80 and at least one second annular frame 82 having an internal edge 82.1 which cooperates with the rear end 64.2 of the fan casing 64 and an external edge 82.2 which is connected to the second external wall 80. This wall is offset backwards relative to the second annular frame 82.

Figure 9:
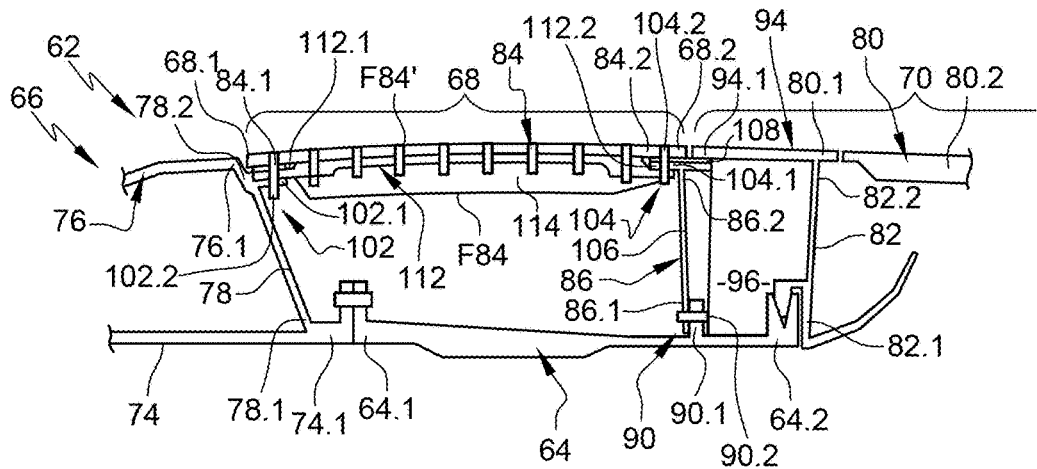
FIG. 9 is a schematic longitudinal section of a portion of a propulsion assembly illustrating another embodiment of the invention.

According to a configuration which can be seen in FIG. 9, the second external wall 80 comprises an upstream portion 80.1 which is fixedly joined to the second annular frame 82 and a downstream portion 80.2 which is separated from the upstream portion 80.1, the downstream portion 80.2 being movable, in a direction parallel with the longitudinal direction, between a closed position, in which the downstream portion 80.2 is slightly spaced apart from the upstream portion 80.1, and an open position, in which the downstream portion 80.2 is spaced apart from the upstream portion 80.1, which generates at least one lateral opening for the thrust reversal device.

According to one embodiment, the rear portion 70 is approximately tubular or frustoconical and is composed of three C-shaped half-sections which are substantially symmetrical relative to a vertical longitudinal plane, each of them extending between an upper edge and a lower edge. The upper edge of each C-shaped half-section is connected to the secondary structure of the strut by an articulation which has a pivot axis which is substantially parallel with the longitudinal direction. Thus, each C-shaped half-section can pivot between a closed position, in which the lower edges of the C-shaped half-sections are abutting and retained in a closed position by a locking system, and an open position, in which the lower edges of the C-shaped half-sections are spaced apart and allow access to the motorization unit 60. The motorization unit 60, the air inlet 66 and the rear portion 70 are not described in greater detail because they may be identical to those of the prior art. Whatever the embodiment, the propulsion assembly 58 comprises a fan casing 64 which extends between front and rear ends 64.1, 64.2 and a nacelle 62 which comprises, in a backward direction, an air inlet 66 which is connected to the front end 64.1 of the fan casing 64, an intermediate portion 68 which is positioned around the fan casing 64 and a rear portion 70 which cooperates with the rear end 64.2 of the fan casing 64.

According to one feature, the intermediate portion 68 comprises at least one aerodynamic panel 84 which extends from the front edge 68.1 of the intermediate portion 68 as far as the rear edge 68.2 of the intermediate portion 68 and at least one intermediate radial support 86, which is positioned between the first and second annular frames 78, 82 and which has an internal edge 86.1 which is connected to the fan casing 64 and an external edge 86.2 which is connected to the aerodynamic panel 84. According to one configuration, the intermediate radial support 86 is nearer the rear edge 68.2 than the front edge 68.1.

Thus, unlike the caps of the prior art, no aerodynamic panel of the intermediate portion 68 is supported by the secondary structure of the strut. Consequently, this structure can be shortened, which leads to a reduction of the mass thereof. According to another aspect, unlike the pivoting caps of the prior art, the aerodynamic panels are fixed. Thus, no articulation is provided in order to pivot the caps, which allows a reduction of the mass of the propulsion assembly.

According to one configuration, the intermediate radial support 86 extends over the entire circumference of the nacelle 62, all the way around the fan casing 64. According to this configuration, the intermediate radial support 86 is an annular radial support. Depending on the circumstances, the intermediate radial support 86 is constituted by a single piece or several angular sectors which are connected to each other. According to one embodiment, the intermediate radial support 86 comprises a plurality of recesses 88 in order to reduce the mass thereof.

According to one embodiment, the propulsion assembly 58 comprises a first connection 90 which connects the internal edge 86.1 of the intermediate radial support 86 and the fan casing 64. According to one configuration, the first connection 90 comprises a collar 90.1 which is fixedly joined to the fan casing 64 and which is positioned substantially in a transverse plane, against which the internal edge 86.1 of the intermediate radial support 86 is applied, and fixing elements 90.2 which are orientated longitudinally, passing through the collar 90.1 and the intermediate radial support 86 and connecting them. Naturally, the invention is not limited to this embodiment for the first connection 90.

According to one arrangement, the propulsion assembly 58 comprises at least one equipment item 92, such as, for example, an actuator, which is fixedly joined to the rear portion 70 and which is positioned in front of the second annular frame 82 of the rear portion 70. According to this arrangement, the intermediate radial support 86 is spaced apart from the second annular frame 82 of the rear portion 70 by a distance which is sufficient to receive the equipment item(s) 92.

According to this arrangement, the second external wall 80 of the rear portion 70 comprises at least one extension 94 which extends in front of the second annular frame 82 and has a front edge 94.1 which is slightly spaced apart from the aerodynamic panel(s) 84. This extension 94 allows closure of a zone 96 which is delimited by the intermediate radial support 86, the second annular frame 82 of the rear portion 70 and the fan casing 64 and in which the equipment item(s) 92 is/are positioned. The extension 94 has a length (dimension taken in a direction parallel with the longitudinal direction) between 5 and 60 cm.

Figure 11:
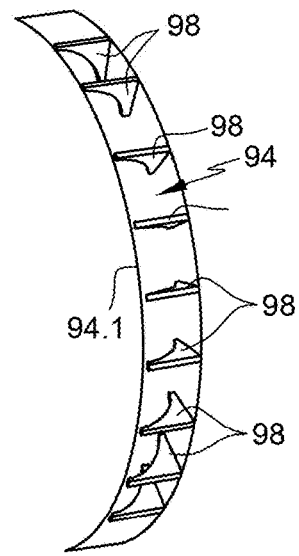
FIG. 11 is a perspective view of part of a rear portion of a nacelle of an aircraft illustrating an embodiment of the invention.

According to one embodiment, which can be seen in FIG. 11, the extension 94 has a half-cylindrical shape. Additionally, the rear portion 70 comprises a plurality of brackets 98 which connect the second annular frame 82 and the extension 94 and which are distributed over the circumference of the nacelle 62 and positioned in longitudinal planes. These brackets 98 allow the extension 94 to be rigidified. According to one configuration, the rear portion 70 comprises two extensions 94, one for each C-shaped half-section of the rear portion 70.

Figure 10:
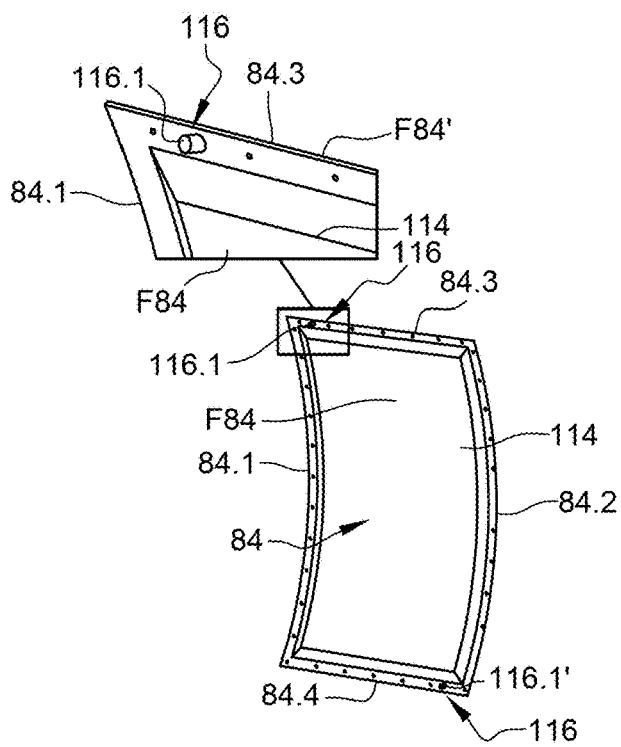
FIG. 10 is a perspective view of an aerodynamic panel of a nacelle of an aircraft illustrating an embodiment of the invention.
Figure 12:
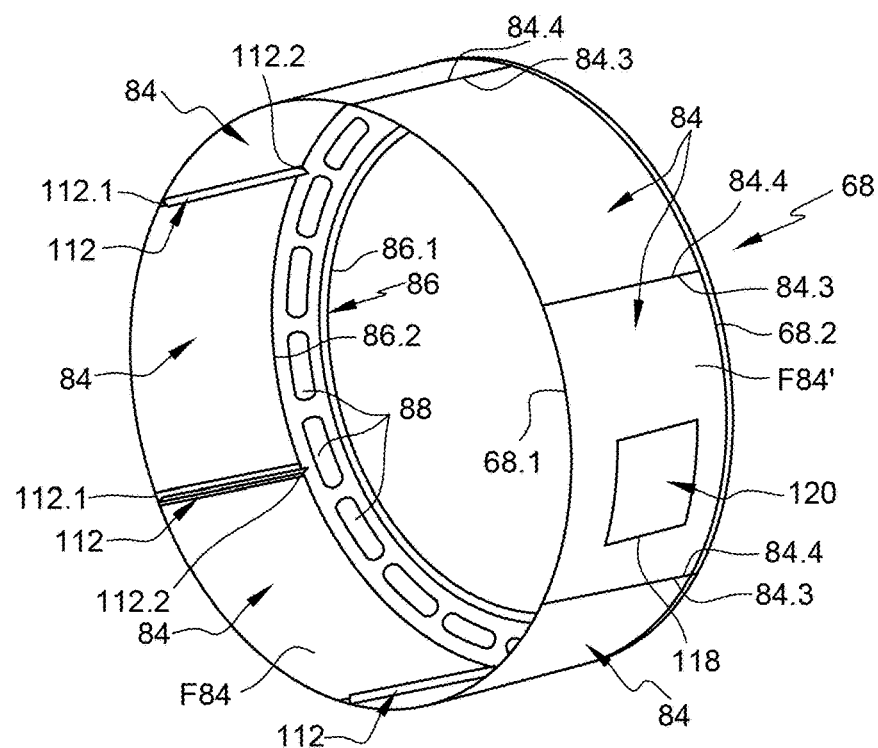
FIG. 12 is a perspective view of an intermediate portion of a nacelle of an aircraft illustrating an embodiment of the invention.

According to one embodiment, which can be seen in FIGS. 10 and 12, the intermediate portion 68 comprises a plurality of fixed aerodynamic panels 84 which are attached to each other and distributed over the circumference of the nacelle 62, each of them extending between the front and rear edges 68.1, 68.2 of the intermediate portion 68.

According to an arrangement which is given by way of non-limiting example, the intermediate portion 68 comprises six aerodynamic panels 84, three at one side and three at the other side of the vertical longitudinal plane.

Each aerodynamic panel 84 has an internal face F84 which is orientated towards the fan casing 64, an external face F84' opposite the internal face F84, a front edge 84.1 which is positioned in a first transverse plane, a rear edge 84.2 which is positioned in a second transverse plane, a first longitudinal edge 84.3 which is positioned in a first longitudinal plane and a second longitudinal edge 84.4 which is positioned in a second longitudinal plane.

For each aerodynamic panel 84, the front edge 84.1 thereof is connected by a first connection system 102 to the air inlet 66, more specifically to the first annular frame 78 of the air inlet 66. The rear edge 84.2 of each aerodynamic panel 85 is connected by a second connection system 104 to the intermediate radial support 86.

The fact that the front edge 84.1 of each aerodynamic panel 84 is connected to the air inlet 66 allows a limitation of the risks of scooping and accidental opening of the aerodynamic panels 84.

According to one embodiment, the first connection system 102 comprises at least a first edge 102.1 which is fixedly joined to the first annular frame 78 and which is positioned in the region of or near the external edge 78.2 of the first annular frame 78, against which at least one of the aerodynamic panels 84 is applied, and a plurality of connection elements 102.2, connecting the aerodynamic panel 84 and the first edge 102.1, which are distributed over at least a portion of the circumference of the nacelle 62. According to one arrangement, the first edge 102.1 extends, continuously or discontinuously, over the entire circumference of the nacelle 62 and has a cylindrical shape. The first edge 102.1 and the aerodynamic panels 84 are configured so that the external surface F84' of each aerodynamic panel 84 is flush with that of the first external wall 76 of the air inlet 66. Shims can be interposed between the aerodynamic panel(s) and the first edge 102.1.

According to one embodiment, the second connection system 104 comprises at least a second edge 104.1 which is fixedly joined to the intermediate radial support 86 and which is positioned in the region of or near the external edge 86.2 of the intermediate radial support 86, against which at least one of the aerodynamic panels 84 is applied, and a plurality of connection elements 104.2, connecting the aerodynamic panel 84 and the second edge 104.1, which are distributed over at least a portion of the circumference of the nacelle 62. According to one arrangement, the second edge 104.1 extends, continuously or discontinuously, over the entire circumference of the nacelle 62 and has a cylindrical shape. The second edge 104.1 and each aerodynamic panel 84 are configured so that the external surface F84' of each aerodynamic panel 84 is flush with that of the second external wall 80 of the rear portion 70. Shims can be interposed between the aerodynamic panel(s) and the second edge 104.1. According to one configuration, the connection elements 102.2, 104.2 are able to be disassembled and are distributed all the way around the nacelle 62.

Figure 6:
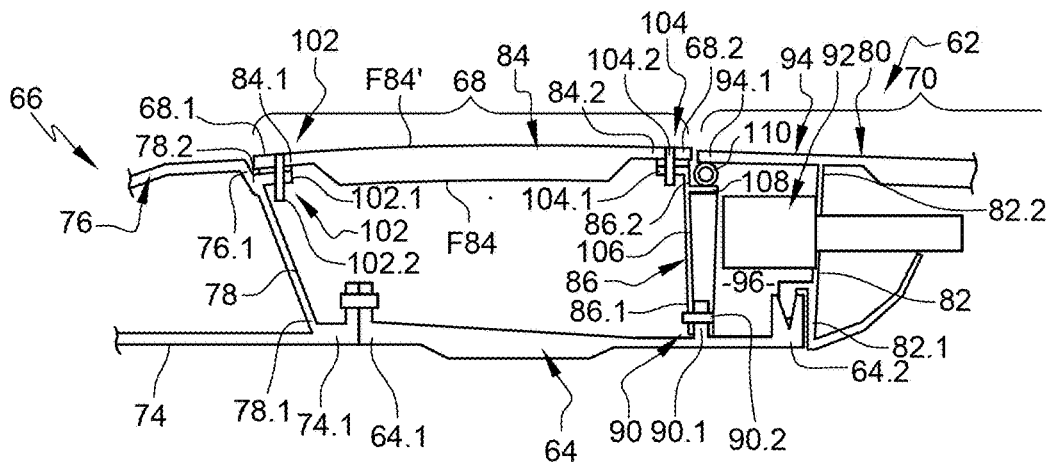
FIG. 6 is a schematic longitudinal section of a portion of a propulsion assembly illustrating an embodiment of the invention, the rear portion of the nacelle being in a closed position.
Figure 7:
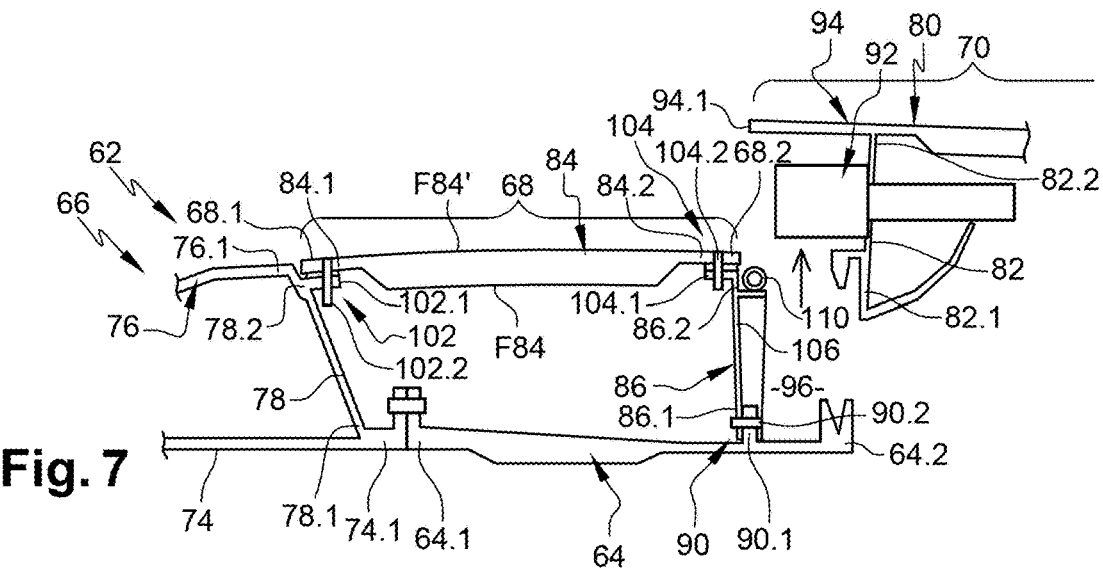
FIG. 7 is a schematic longitudinal section of the portion of the propulsion assembly visible in FIG. 6, the rear portion of the nacelle being in an open position.

According to one embodiment, which can be seen in FIGS. 6 and 7, the intermediate radial support 86 comprises:
- a web 106 which is positioned approximately in a transverse plane,
- at least one front wing which is offset forwards relative to the web 106, forming the second support 104.1 in order to support the aerodynamic panels 84,
- at least one rear wing 108 which is offset backwards relative to the web 106, forming a support surface for the second external wall 80 of the rear portion 70 and more particularly for the extension 94 thereof when the C-shaped half-sections of the rear portion 70 are in a closed position.

Each of the front and rear wings extends, in a longitudinal plane, perpendicularly to the web 106. In a transverse plane, each of the front and rear wings follows the curvature of the aerodynamic panels 84 and the third external wall 80. According to one arrangement, each of the front and rear wings extends over the entire circumference of the nacelle 62. The web 106 comprises recesses 88.

According to one embodiment, the propulsion assembly 58 comprises at least one sealing joint 110 which is fixedly joined to the rear wing 108 and which is interposed between the rear wing 108 and the second external wall 80 of the rear portion 70 and more particularly the extension 94 thereof. This sealing joint 110 extends at least over a portion of the circumference of the nacelle 62.

According to one configuration, the intermediate portion 68 comprises at least one longitudinal reinforcement 112 which has a first end 112.1 which is connected to the air inlet 66, more particularly to the external edge 78.2 of the first annular frame 78 of the air inlet 66, and a second end 112.2 which is connected to the intermediate radial support 86, more particularly to the external edge 86.2 thereof, each longitudinal reinforcement 112 forming a support surface for at least one of the aerodynamic panels 84.

According to one arrangement, the first end 112.1 of each longitudinal reinforcement 112 is connected to the first edge 102.1, the first end 112.1 being interposed between the first edge 102.1 and the aerodynamic panel(s) 84. The second end 112.2 of each longitudinal reinforcement 112 is connected to the second edge 104.1, this edge being interposed between the second end 112.2 and the aerodynamic panel 84.

According to one embodiment, the intermediate portion 68 comprises as many longitudinal reinforcements 112 as aerodynamic panels 84, each longitudinal reinforcement 112 being positioned in the region of a junction zone of two aerodynamic panels 84 and being configured to form a support surface at a first longitudinal edge 84.3 of a first aerodynamic panel 84 and at a second longitudinal edge 84.4 of a second panel 84.

According to this embodiment, for each aerodynamic panel 84, the first and second edges 102.1, 104.1 and the longitudinal reinforcements 112 form frames, against which the edges 84.1, 84.2, 84.3, 84.4 of the aerodynamic panels 84 are supported.

Additionally, each aerodynamic panel 84 comprises in the region of the internal face F84 thereof a reinforced central portion 114 which is spaced apart from the edges 84.1, 84.2, 84.3 and 84.4 and which form an excess thickness relative to the edges 84.1, 84.2, 84.3 and 84.4. This central portion 114 has a truncated-pyramid-like form in order to facilitate the positioning of the aerodynamic panel 84 relative to the frames which are formed by the first and second edges 102.1, 104.1 and the longitudinal reinforcements 112.

According to one embodiment, the intermediate portion 68 comprises, for each aerodynamic panel 84, at least one centering system 116 which is configured to position each aerodynamic panel 84 during the assembly thereof. According to one embodiment, the centering system 116 comprises, for each aerodynamic panel 84, at least one centering pin 116.1 which is fixedly joined to the aerodynamic panel 84 and which projects relative to the internal face F84 thereof and, for each centering pin 116.1, at least one centering hole which is configured to cooperate with the centering pin 116 and which is provided in the region of an element which is fixedly joined to the fan casing 64 from among the first and second edges 102.1, 104.1 and the longitudinal reinforcements 112. According to one embodiment, each aerodynamic panel 84 comprises first and second centering pins 116.1, 116.1', the first centering pin 116.1 being positioned in the region of the first longitudinal edge 84.3 near the front edge 84.1, the second centering pin 116.1' being positioned in the region of the second longitudinal edge 84.4 near the rear edge 84.2. Additionally, each longitudinal reinforcement 112 comprises a first centering hole which is configured to receive the first centering pin 116.1 of a first aerodynamic panel 84 and a second centering hole which is configured to receive the second centering pin 116.1' of a second panel 84.

According to one configuration, which can be seen in FIGS. 5 and 12, at least one aerodynamic panel 84 comprises at least one opening 118 which extends through the aerodynamic panel 84 and, for each opening 118, a flap 120 which is connected to the aerodynamic panel 84 by an articulation which is movable between a closed position, in which the flap 120 blocks the opening 118, and an open position, in which the flap 120 at least partially releases the opening 118, and a locking/unlocking system which is configured to keep the flap 120 in a closed position.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly comprising:
a fan casing which extends between front and rear ends,
a nacelle which comprises, in a backward direction, an air inlet which is connected to the front end of the fan casing, an intermediate portion which is positioned around the fan casing, and a rear portion which cooperates with the rear end of the fan casing, the intermediate portion extending between a front edge which is attached to the air inlet and a rear edge which is attached to the rear portion and which comprises at least one aerodynamic panel which extends from the front edge as far as the rear edge of the intermediate portion,
wherein the intermediate portion comprises at least one intermediate radial support comprising an internal edge which is connected to the fan casing and an external edge which is connected to the at least one aerodynamic panel which comprises a front edge which is connected to the air inlet by a first connection system,
wherein the rear portion comprises at least a second external wall and at least a second annular frame which has an internal edge which cooperates with the rear end of the fan casing and an external edge which is connected to the second external wall,
wherein the intermediate radial support is spaced apart from the second annular frame of the rear portion, and
wherein the second external wall of the rear portion comprises at least one extension which extends in front of the second annular frame and which has a front edge spaced apart from the at least one aerodynamic panel.

2. The propulsion assembly according to claim 1, wherein the air inlet comprises a lip which is located at a front, an internal conduit which extends the lip towards an interior of the nacelle, a first external wall which extends the lip towards an exterior of the nacelle and a first annular frame which has an internal edge which is connected to the internal conduit and an external edge which is connected to the first external wall, and
wherein the first connection system comprises at least a first edge which is fixedly joined to the first annular frame and which is positioned in a region of the external edge of the first annular frame, and a plurality of connection elements which connect the at least one aerodynamic panel and the first edge and which are distributed over at least a portion of a circumference of the nacelle.

3. The propulsion assembly according to claim 1, wherein each aerodynamic panel comprises a rear edge which is connected by a second connection system to the at least one intermediate radial support, and wherein the second connection system comprises at least a second edge which is fixedly joined to the at least one intermediate radial support and which is positioned in a region of the external edge of the at least one intermediate radial support, and a plurality of connection elements which connect the at least one aerodynamic panel and the second edge and which are distributed over at least a portion of a circumference of the nacelle.

4. The propulsion assembly according to claim 1, wherein the at least one extension has a half-cylindrical shape, and wherein the rear portion comprises a plurality of brackets which connect the second annular frame and the at least one extension and which are distributed over a circumference of the nacelle.

5. The propulsion assembly according to claim 4, wherein the at least one intermediate radial support comprises a web which is positioned approximately in a transverse plane and at least one rear wing which is offset towards a rear relative to the web, forming a support surface for the at least one extension of the rear portion.

6. The propulsion assembly according to claim 5, further comprising:

at least one sealing joint interposed between the rear wing and the at least one extension of the rear portion.

7. The propulsion assembly according to claim 1, wherein the intermediate portion comprises a plurality of aerodynamic panels which are attached to each other and which are distributed over a circumference of the nacelle.

8. The propulsion assembly according to claim 7, wherein the intermediate portion comprises at least one longitudinal reinforcement which has a first end which is connected to the air inlet and a second end which is connected to the at least one intermediate radial support.

9. The propulsion assembly according to claim 8, wherein the intermediate portion comprises as many longitudinal reinforcements as aerodynamic panels, each longitudinal reinforcement being positioned in a region of a junction zone of two aerodynamic panels and being configured to form a support surface at a first longitudinal edge of a first aerodynamic panel and at a second longitudinal edge of a second aerodynamic panel.

10. The propulsion assembly according to claim 1, wherein each aerodynamic panel has an internal face which is orientated towards the fan casing, a front edge which is positioned in a first transverse plane, a rear edge which is positioned in a second transverse plane, a first longitudinal edge which is positioned in a first longitudinal plane and a second longitudinal edge which is positioned in a second longitudinal plane, and wherein each aerodynamic panel comprises in a region of the internal face thereof a central portion which is reinforced and spaced apart from the front and rear edges and which forms an excess thickness relative to the front and rear edges.

11. The propulsion assembly according to claim 1, wherein the intermediate portion comprises, for each aerodynamic panel, at least one centering system configured to position each aerodynamic panel during a mounting thereof.

12. The propulsion assembly according to claim 11, wherein the centering system comprises, for each aerodynamic panel, at least one centering pin which is fixedly joined to the aerodynamic panel and, for each centering pin, at least one centering hole which is configured to cooperate with the at least one centering pin and which is provided in a region of an element which is fixedly joined to the fan casing.

13. The propulsion assembly according to claim 1, wherein the at least one intermediate radial support extends over an entire circumference of the nacelle and comprises a plurality of recesses.

14. An aircraft comprising:

the propulsion assembly according to claim 1.

* * * * *